(No Model.)

J. D. REED.
PRESERVING MEAT.

No. 377,404. Patented Feb. 7, 1888.

Witnesses.
H. E. Lodge
Henry Lamb

Inventor.
John D. Reed.
F. Curtis, Atty.

UNITED STATES PATENT OFFICE.

JOHN D. REED, OF BOSTON, MASSACHUSETTS.

PRESERVING MEAT.

SPECIFICATION forming part of Letters Patent No. 377,404, dated February 7, 1888.

Application filed May 10, 1886. Serial No. 201,656. (No model.)

*To all whom it may concern:*

Be it known that I, JOHN D. REED, a citizen of the United States, residing at Boston, in the county of Suffolk and State of Massachusetts, have invented certain new and useful Improvements in Preserving Meats; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the preserving of meats, more particularly those which are treated or cured by the process of smoking; and it consists, primarily, in the method whereby the meat is roasted simultaneously with and during the act of smoking; furthermore, in the employment of corn-cobs as the fuel by which said process is accomplished in a more efficacious manner, with far better results as regards the flavor and quality of the meat, also the saving of time in effecting the operation.

My invention further relates to the apparatus, hereinafter more fully described, by which said process is carried out, and which is adapted to the use of corn-cobs as fuel.

Figure 1:
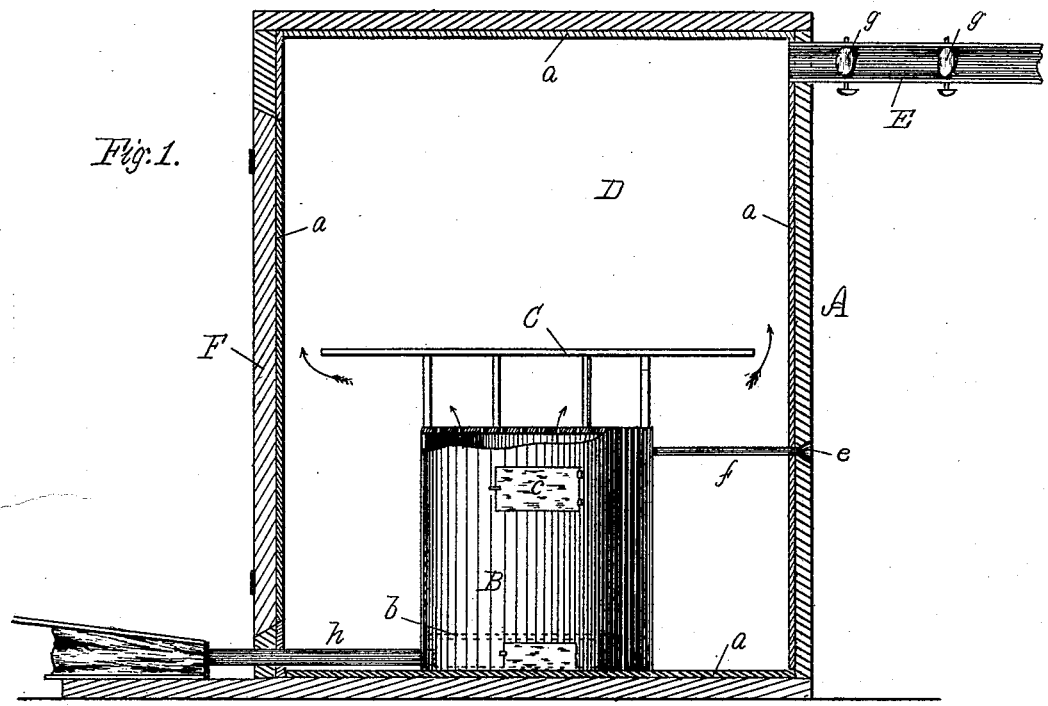
Figure 2:
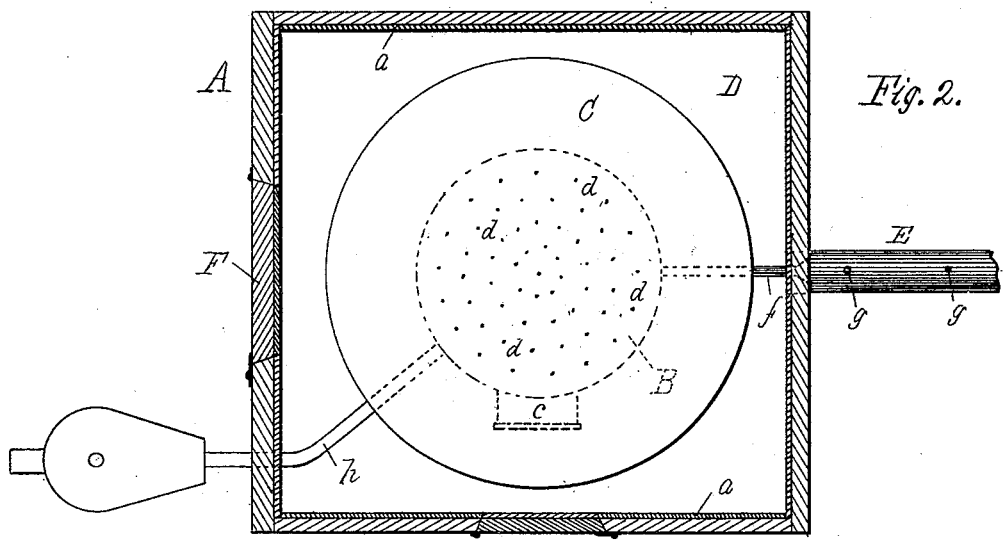

The drawings accompanying this specification represent, in Figure 1, a sectional elevation, and Fig. 2, a plan, of an apparatus adapted to perform the process which embodies my invention.

Hitherto in the preservation and curing of meat various methods and processes have been tried, of which treatment with chemicals and by smoke have been the ones most commonly adopted. In most cases, however, the meat, after undergoing such treatment of curing, has been left in a raw or uncooked condition.

My invention has for its object the curing of meat for immediate use, and is effected by smoking, and simultaneously with said process and with the heat generated by the combustion of the fuel which produces the smoke to effect the roasting of said meat, thus preserving it and at the same time rendering it fit for immediate use.

Now, in the process of curing by smoking, I prefer to use corn-cobs exclusively as fuel, since they are cheap, readily obtainable in large quantities, and, most important of all, impart a most beneficial effect and produce a peculiarly nice flavor in the meat subjected to the smoke resulting from their combustion; hence I have adopted the apparatus, which I shall now proceed to describe, and which is modified in its construction to the burning of corn-cobs as fuel in the roasting and smoking process.

In said drawings, A represents the preserving apparatus lined with sheet metal, $a$, or with some other non-combustible material, wherein the meat is roasted and smoked simultaneously, the size and shape of this chamber depending entirely upon its location or the demands and requirements of the business in which it is to be employed. Within the chamber is located the furnace B, which is preferably circular in form, and is provided with a grate, $b$, disposed near the bottom, while the feed-door $c$ is in the upper portion in order to contain a large amount of fuel or a deep fire. Entrance is had to the preserving-chamber through the door F, which is made to close snugly to render the chamber as nearly airtight as possible.

The top plate of the furnace is perforated at $d\ d$ for smoke-apertures, and is surmounted with a metallic deflector or guard-plate, C, somewhat larger than the furnace. Above this is the smoking-chamber D, and this plate is arranged to prevent any flame which may arise from the furnace scorching or injuring the meat then in process of preserving.

At $e$ is shown a peep-hole, connected with the furnace by the pipe $f$, and by means of which the state of combustion of the fuel in the furnace is readily ascertained, and then controlled by apparatus to be now described.

In this invention or process of roasting and smoking at the same time the conditions are somewhat altered than when either of these acts are performed separately; hence I have constructed the chamber A to provide for both contingencies. For the smoking part of the process said chamber is made air-tight, or approximately so, and provided with the flue E, which leads from the top of said chamber, and fitted with two or more dampers, $g\ g$, so as to prevent all air-currents, if desired. On the other hand, to secure the necessary combination for generating the heat requisite for the roasting, I have arranged a pipe or duct, h, through which a supply of air is to be forced by a bellows, or other suitable means, into and within the furnace. Thus it will be seen that the apparatus can be easily governed to produce either heat or smoke, or both, just as the process requires. By this method of roasting and smoking several advantages are secured, the most important of which is the economy in time, since by the application of heat to effect the cooking of the meat then in process the pores of the latter are opened and the smoke is free to penetrate more thoroughly and readily; hence, in lieu of treating a ham forty-eight hours or more, as is now required in smoking, when they are still left in a raw state, said smoking process can be accomplished by my method and apparatus in eight hours, and the meat is cooked and smoked at the same time in four hours or thereabout. Furthermore, the use of corn-cobs as fuel plays an important part in obtaining the results, since I find that meat so roasted and smoked is decidedly superior to that treated with wood or other kinds of fuel, and the fatty portions lose certain objectionable qualities and have a peculiar flavor imparted to them, which cannot be attained with other fuel.

I am aware that smoking and boiling have been combined in one and the same process; but this is obviously a difficult matter and requires an intermediary agent (a bladder) to produce the result. In my process the meat is hung up as in the ordinary method of smoking, but at the same time roasted instead of being left in an uncooked state after the smoking, as is now universally practiced.

I claim—

In combination with an air-tight smoke-chamber, a furnace located thereon and having a number of perforations in its top for the escape of smoke, and the plate C, supported upon and raised above said furnace, substantially as set forth.

In testimony whereof I affix my signature in presence of two witnesses.

JOHN D. REED.

Witnesses:
H. E. LODGE,
F. CURTIS.